Aug. 14, 1951  T. B. FARRINGTON ET AL  2,564,328
OVERHEAD MOUNTING FOR TUBULAR LIGHTING FIXTURES
Filed April 23, 1945  8 Sheets-Sheet 1

INVENTORS.
THAYER B. FARRINGTON
WADE T. KELLER
HAROLD L. DALZELL
BY Hyde and Meyer.
ATTORNEYS.

Aug. 14, 1951     T. B. FARRINGTON ET AL     2,564,328
OVERHEAD MOUNTING FOR TUBULAR LIGHTING FIXTURES

Filed April 23, 1945          8 Sheets-Sheet 3

INVENTORS.
THAYER B. FARRINGTON
WADE T. KELLER
HAROLD L. DALZELL
BY Hyde and Meyer
ATTORNEYS.

Aug. 14, 1951     T. B. FARRINGTON ET AL     2,564,328
OVERHEAD MOUNTING FOR TUBULAR LIGHTING FIXTURES
Filed April 23, 1945     8 Sheets-Sheet 4

INVENTORS.
THAYER B. FARRINGTON
WADE T. KELLER
HAROLD L. DALZELL
BY Hyde and Meyer
ATTORNEYS.

Aug. 14, 1951  T. B. FARRINGTON ET AL  2,564,328
OVERHEAD MOUNTING FOR TUBULAR LIGHTING FIXTURES
Filed April 23, 1945  8 Sheets-Sheet 7

INVENTORS.
THAYER B. FARRINGTON
WADE T. KELLER
HAROLD L. DALZELL
BY Hyde and Meyer
ATTORNEYS.

Aug. 14, 1951  T. B. FARRINGTON ET AL  2,564,328
OVERHEAD MOUNTING FOR TUBULAR LIGHTING FIXTURES
Filed April 23, 1945  8 Sheets-Sheet 8

INVENTORS.
THAYER B. FARRINGTON
WADE T. KELLER
HAROLD L. DALZELL
BY Hyde and Myer
ATTORNEYS.

Patented Aug. 14, 1951

2,564,328

UNITED STATES PATENT OFFICE 2,564,328

OVERHEAD MOUNTING FOR TUBULAR LIGHTING FIXTURES

Thayer B. Farrington, Cleveland Heights, and Wade T. Keller and Harold L. Dalzell, Cleveland, Ohio, assignors to The Thompson Electric Company, Cleveland, Ohio, a corporation of Ohio Application April 23, 1945, Serial No. 589,822

3 Claims. (Cl. 248—320)

This invention relates to improvements in disconnecting and lowering lamp-hanger structure.

An object of the present invention is to provide an improvement in the combination of a fixed hanger member in an elevated position and a lowering hanger member adapted to be raised and lowered therebeneath, said lowering member carrying a lamp. Our improvement provides power means for assisting at least the lamp hanger raising operation. In one form, the power means is a spring in which energy is stored during the lowering operation, and in another form, the power means is an electric motor.

An object of the present invention is to provide an improvement in lighting fixtures wherein fixed electrical contacts are mounted in an elevated position and supplied with electricity from a suitable source, and a lamp-supporting structure, arranged to be raised and lowered with respect to the elevated fixture, is provided with electrical contacts adapted to engage and coact with the fixed contacts so as to energize the lamp when in its raised position. In the above combination, we provide the improvement of a spring-actuated counterbalancing device having flexible tension members for supporting the lowering member from the elevated fixed member, the tension members being so connected with the spring-counterbalancing device as to load the spring as the lamp fixture is lowered so that the weight of a relatively large fixture may be counterbalanced and the energy of the spring may be utilized to assist return of the lamp fixture to its elevated position.

Our invention also provides a fixed trough-like member adapted to be secured in an elevated position either in one piece or a plurality of pieces of sufficient length that a plurality of lowering lamp hanger members may be housed in the trough-like member and raised and lowered relative thereto. In such a device, each of the lowering members carries the electrical equipment for energization and control of the lamps in an exposed arrangement, when lowered, for easy accessibility for maintenance, repair, and replacement, all of these electrical parts being housed within the trough-like elevated fixture when the lamp supporting member is raised.

In apparatus like that described above, fixed electrical conductors may utilize the elevated trough-like member as a wiring conduit, the various sets of contacts being arranged in spaced relationship along the trough-like member, electrically connected with these conductors, and each set of contacts being adapted to energize the associated lowering lamp hanger member.

Our invention is peculiarly adapted to the support of tubular lamps of either the hot or cold cathode type. Such lamps are often of a dimension rendering them unwieldy. Also these lamps require ballast or transformer devices, starters for the lamps, and special tube sockets all of which may be mounted by our improved arrangement on the lowering member for easy accessibility. Our invention also provides for the easy removal of the tubular lamps and elongated reflectors associated therewith so that these parts are readily disassembled from all electrical parts and may be readily washed by inexperienced help.

Certain features of our invention are not limited to lamps of the tubular type as will hereinafter appear.

The present invention provides novel means for insuring equalized engagement of a plurality of electrical contacts, part of which are fixed and part of which are connected with the lowering lamp-supporting member.

Our invention also provides novel means for removably latching the lowering member to the elevated member when the parts are in position for use.

Our invention also contemplates the use of various spring actuated counterbalancing devices, some of which are peculiarly adapted for the mounting of lamps in a more elevated position than other of the embodiments as will appear from the description.

Still another object of the invention is to provide means for locking a hanger member in lowered position during a servicing operation.

Other objects of the present invention include the specific arrangement of the various parts including the fixed elevated members, the frame of the lowering member and arrangement of parts thereon, the details of the connection and control of the flexible tension members which support the lowering hanger, the means for insuring proper registration of the fixed elevated member and the lowering lamp supporting member when they are mutually engaged in operating position, and other improvements in the various parts and functional relationship thereof as will more fully appear from the accompanying drawings and description.

Figures 1, 2, 3:
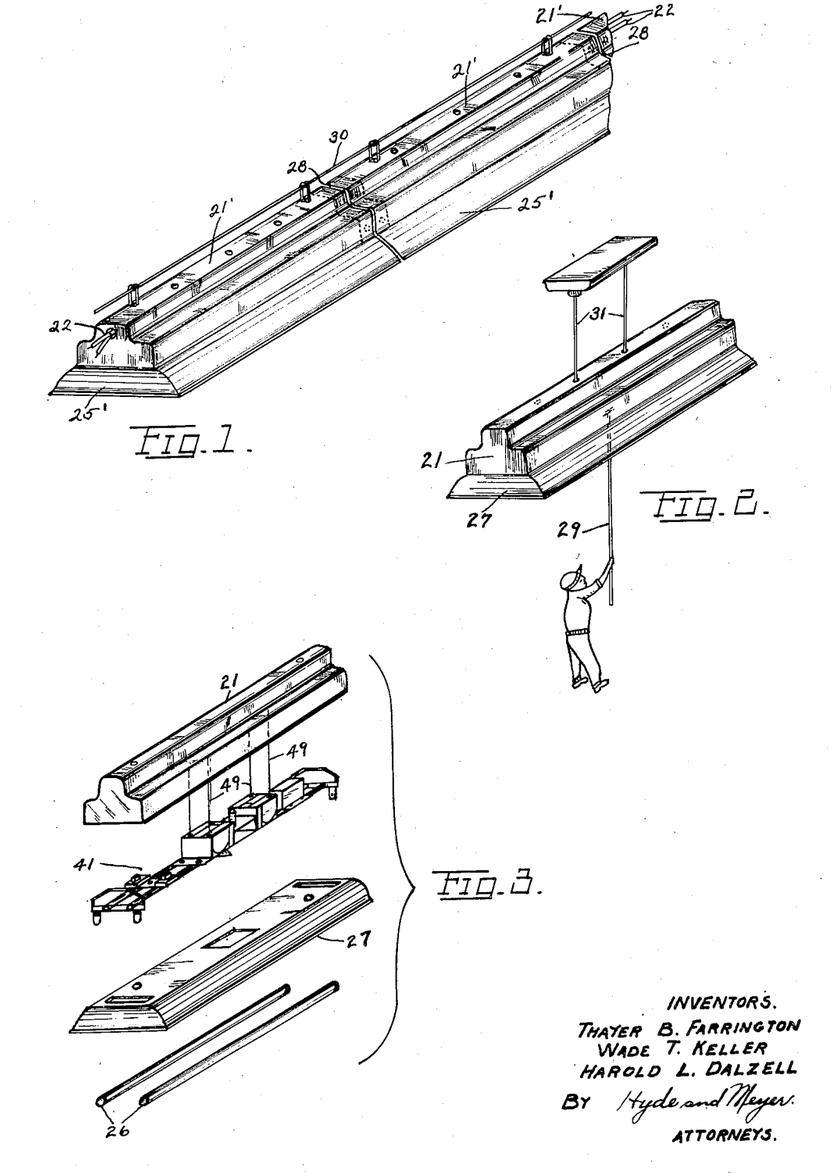
Fig. 1 is a perspective view showing a continuous trough-like member fixed in elevated position and adapted to coact with a plurality of lowering lamp hanger members.
Fig. 2 shows a single lamp hanger member associated with an elevated fixed member supported on drop stems from a ceiling or the like and illustrating the operation of lowering and raising the lamp-hanger member.
Fig. 3 is an exploded view of the device of Fig. 2 illustrating how the lamp-supporting member may be lowered and the reflector and tubular lamps separated therefrom.

As shown in Figs. 1 to 7, one form of our device contemplates the mounting of a downwardly opening trough-like device 21 adapted to house electrical conductors 22 for supplying energy to a pair of fixed electrical contacts 23 which engage the separable contacts 24 on a lowering lamp hanger member generally designated 25 which carries one or more tubular lamps 26 and a reflector 27. A single such combination may be utilized as shown in Figs. 2 and 3, or a plurality of trough-like members 21 may be secured end to end as indicated at 21' (Fig. 1), secured together by channel couplers 28. In such an arrangement, a plurality of lowering members 25' may be housed in the continuous member 21', there being pairs of contacts 23—24 for each of the devices 25', each of the pairs of contacts 23 being connected with conductors 22' which extend the entire length of the trough-like member 21'. It results from this construction that the member 21' serves the double purpose of housing the parts of the lamp hanger member when the latter is in elevated position and also as a wiring conduit for the electrical conductors 22'. With our improved arrangement it is possible to arrange a continuous member 21' along the length of an elevated ceiling as in a large store, assembly room, or the like with a plurality of individual fixtures 25', like those presently to be described, each fixture supporting lamps and reflectors and adapted to be individually lowered and serviced without the use of ladders, cumbersome loose cables, or the like. The only equipment needed for the lowering of the lamp hanger members is the stick 29 used by the operator.

In Fig. 1, we have shown the member 21' which is suspended from a span wire 30 but which may be attached directly to the ceiling structure as shown in certain other of the views or may be supported on a plurality of drop stems 31 provided all of the members 21' are supported at the same level and connected end to end to form a continuous trough or conduit.

Referring now more specifically to Figs. 3 to 7, we will describe one of the lowering lamp hanger members 25 and its cooperation with the fixed member 21, but it should be understood that the members 25' and 21' of Fig. 1 are exactly like these except for the elimination of end walls at the point 28 of Fig. 1, and these specific differences will be pointed out later.

The member 21 which is mounted in a fixed elevated position comprises a downwardly opening trough-like structure of sheet material or the like and comprises a top wall 21a through which the securing members pass for attaching the member 21 either directly to the ceiling or to a span wire 30 or to drop stems 31 or other suitable mounting structure. Extending downwardly from the top wall 21a are the parallel side walls 21b which define the narrow upper portion of the trough. Below this are the shoulder walls 21c extending laterally outwardly and connected with the depending side walls 21d which define the lower and wider portion of the trough. The bottom edges of these walls 21d may be provided with an inturned bead 21e to give a finished appearance and to cooperate smoothly with the guiding portions of the lowering hanger member as will later appear. Mounted centrally in the upper narrower portion of the trough and secured to the top wall 21a by means not shown is a channel-shaped base 32. The parallel side flanges 32a of this base extend downwardly and support between them a pair of straps 33 secured to the flanges by the screws 34. In the center of each of these straps is secured an insulator 35 of porcelain or the like to which is secured one of the contacts 23 which preferably has a contact surface facing concavely downwardly. Each of the contacts is electrically connected with a binding post 23a to which is secured by solder or the like a conductor 36, and each of these conductors is electrically connected to one of the supply conductors 22, previously mentioned, in a manner not shown and forming no part of the present invention. Between the straps 33, a strap 37 is provided also supported by the flanges 32a, and in the center of this strap is a slot 38 adapted to receive a latching device later described.

Means is provided for guiding the member 25 into alinement with the member 21. For endwise alinement, this comprises a pair of wing members 39 secured to the fixture 21 and providing walls sloping downwardly and outwardly from the center of the fixture for coacting with portions 40 of the lowering hanger member. For side alinement plates 42 have portions 42b bent to engage the sides of member 21 as the lowering member is raised.

The lowering hanger member 25 consists of an intermediate frame 41 to which the lamps 26 and reflector 27 are detachably connected so that all of the electrical and mechanical working parts are carried by the intermediate frame and readily accessible for maintenance and repairs when the hanger member is lowered, while the lamps and reflector may be removed and readily washed without any danger of moisture reaching any electrical parts. By this arrangement, an unskilled worker can clean the lamps and reflectors without knowing anything about the care and maintenance of the electrical part of the equipment and without danger of doing anything to impair the efficiency of the lighting equipment.

The intermediate frame 41 comprises a pair of elongated parallel rods or bars 41a which extend substantially from end to end of apparatus supporting tubular type lamps such as that disclosed in Figs. 2 to 7. These rods are tied together at the ends by plates 42 welded or otherwise rigidly secured to the under side of the rods. They are also tied together by other members mounted thereon as will presently appear. With lamps of the tubular type shown at 26, a ballast or transformer unit 43 is usually provided. This ballast is shown as supported on two straps 44 rigidly connected to the rods 41a, and the ballast is secured by screws or bolts to the straps 44. Starters are necessary for the lamps 26, and these are shown at 45 mounted on a plate 46 which in turn is rigidly connected to the rods 41a. The lamp sockets 47 are connected to the plates 42 in the usual manner. It will be understood that the lamps 26 are removably secured in the sockets 47 in the usual manner. The electrical contacts 24 are connected by suitable wiring to the ballast 43, the starters 45, and the lamp sockets 47 in a usual and known manner which forms no part of the present invention. It is sufficient to state here that the current furnished at the contacts 24 is suitably changed to supply the lamps 26 and the current fed thereto through the sockets 47 with any known type of control equipment such as the starters 45.

Means is provided for counterbalancing the greater portion of the weight of the lowering hanger member 25 as the same is raised and lowered with reference to the fixture 21. This means takes the form of an energy-storing means 48 mounted on one of the members 21 or 25 and having flexible tension members such as the tapes 49 connected between the energy-storing means and the other part of the fixture so that as the hanger member is lowered and raised, the energy-storing device is loaded and unloaded respectively. As shown in this form of my device, the energy-storing means 48 comprises a plurality of spring actuated sash balances of the general type shown in United States Patent 1,254,647, granted January 29, 1918, to William Bennett, or shown in United States Patent 2,051,412, granted August 18, 1936, to Edgar L. Gardner. It is sufficient to state here that each of the tapes 49 is wound about a drum 48a rotatably mounted on pivot 48b and urged by helical spring 48c in a direction to wind up the tapes 49 on the drum 48a as the hanger member 25 is raised.

The springs 48c have an initial tension tending to wind the tapes 49 on the drums 48a, and this tension is sufficient to balance all but a few pounds of the total weight of the parts to be lowered. Then as the hanger member is lowered by the pull of the operator on the stick 29, the springs 48c are additionally loaded. It results from this construction, that when the lowering hanger member is first unlatched from the upper fixture, the partially unbalanced weight of the lower member causes it to drop quickly a short distance giving a quick break between the mating electrical contacts. The springs 48c then become loaded to the point where they fully balance the weight of the lower member. As the operator pulls the lower member down to a servicing position, the springs are additionally loaded to store energy available later to return the lowering hanger member to a position adjacent the upper fixed member, after which a slight final push serves to latch the lower member to the upper member.

Figure 4:
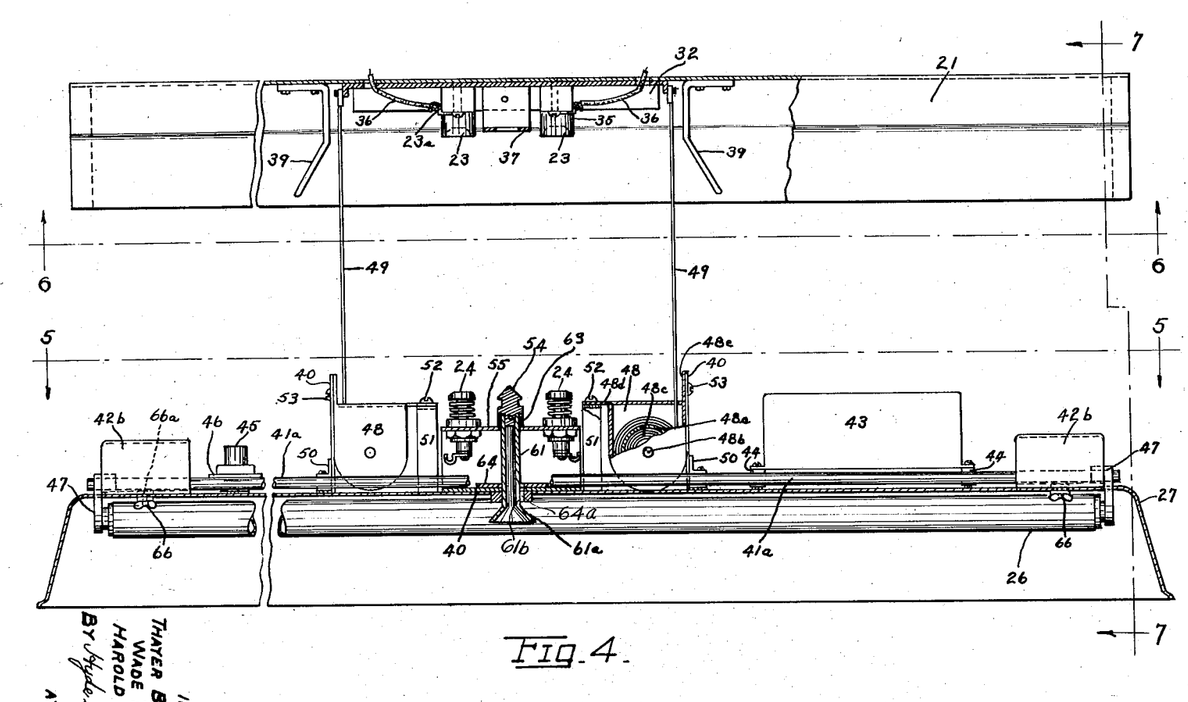
Fig. 4 is a side elevational view of the device of Fig. 2 or one of the devices of Fig. 1 with the lamp hanger partly lowered.

Each of the sash balances shown at 48 has a horizontally extending ear 48d and a vertically extending ear 48e for attachment to the supporting structure about to be described. The members previously designated at 40 are the end members of a generally U-shape frame, the bottom of which lies between the rods 41a. This subframe is secured to the frame 41 by means of angle members 50, each welded to one of the end walls of the subframe 40 and in turn bolted or welded to the rods 41a. Rigidly fastened to the bottom wall of the subframe 40 are bracket members 51 to the upper ends of which the ears 48d are secured as by means of the screws 52. The ears 48e are secured to the subframe 40 by means of the bolts 53. The upper ends of the tapes 49 are secured to the elevated fixture channel member 32 as best seen in Fig. 4. Supporting means for the contacts 24 and the latch member 54 is provided by bracket 55 which is rigidly mounted between the brackets 51. The details of this portion of the device are more clearly shown in Figs. 4 and 8a.

Figure 8:
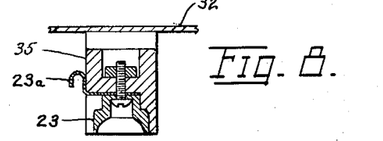
Fig. 8 is an enlarged sectional view through an upper contact taken along the line 8—8 of Fig. 6.
Figure 8A:
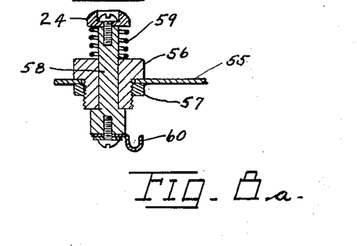
Fig. 8a is an enlarged sectional view through a lower contact taken along the line 8a—8a of Fig. 5.
Figure 9:
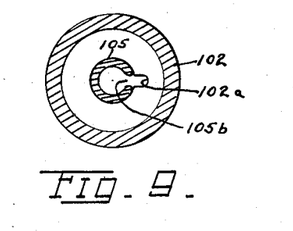
Fig. 9 is a detail sectional view taken along the line 9—9 of Fig. 14.

Referring now to Fig. 8a, in suitable openings in the bracket 55 are mounted porcelain insulators 56 which are held in place by nuts 57. Suitably mounted in the center of each insulator is a vertically positioned rod 58 to the upper end of which is secured one of the contacts 24. A helical spring 59 is engaged between the contact 24 and the insulator 56 so as to yieldably hold each contact 24 in raised position. The wires for energizing the lamps 26 are connected to the binding posts 60 which are electrically connected through the rods 58 with the contacts 24. It results from this contact construction that when the hanger member is raised to operable position where the contacts 24 engage the fixed contacts 23, equalization of pressure between the two pairs of contacts is assured because of the yieldable mounting of the contacts 24.

Figure 14:
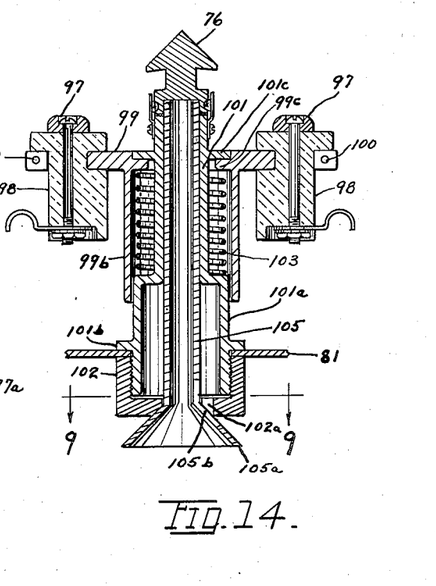
Fig. 14 is an enlarged sectional view taken along the line 14—14 of Fig. 11.

Between the contacts 24 and located centrally of the entire lamp fixture is the latching device 54. As shown in Fig. 4, hollow sleeve 61 is mounted for limited vertical movement in the bracket member 55 and the subframe 40. Suitable collars limit the vertical movement of the sleeve. At its upper end, the sleeve carries the bayonet joint latching end 54 which in general conforms to the shape of the slot 38 previously described but is adapted to pass through the slot. The lower end of the sleeve 61 is flared as shown at 61a, and just within the mouth of this flare an elongated vertical slot 61b is provided in the wall of the sleeve with a registering notch 64a in plate 64 which forms a bottom portion of the bracket 55. These are analogous to slot 105b and notch 102a of Fig. 14. With this construction a rod 29, held in the hands of an operator standing on the floor, is inserted in the flared end 61a. The upper end of the rod carries a laterally extending pin (not shown) of a usual type which is engaged in the slot 61b and serves to rotate the sleeve 61 as the rod 29 is twisted. The operation of the latch should now be obvious. With the latch head 54 in registration with the slot 38, the hanger member 25 is raised until the head 54 has passed through slot 38 in plate 37 so that the head 54 is positioned above plate 37. Then rod 29 is turned so as to rotate sleeve 61 and head 54 through a ninety-degree angle which positions the head 54 crosswise of the slot 38 and latches the lowering hanger member firmly in its upper or operative position.

Figure 5:
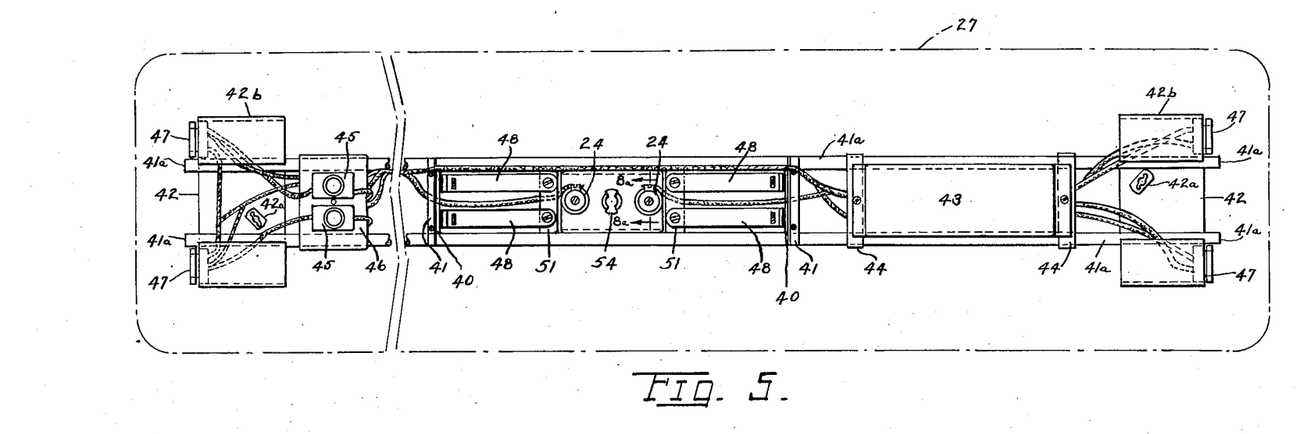
Fig. 5 is a top plan view of a portion of the device of Fig. 4, this view being taken along the line 5—5 of Fig. 4.
Figure 6:
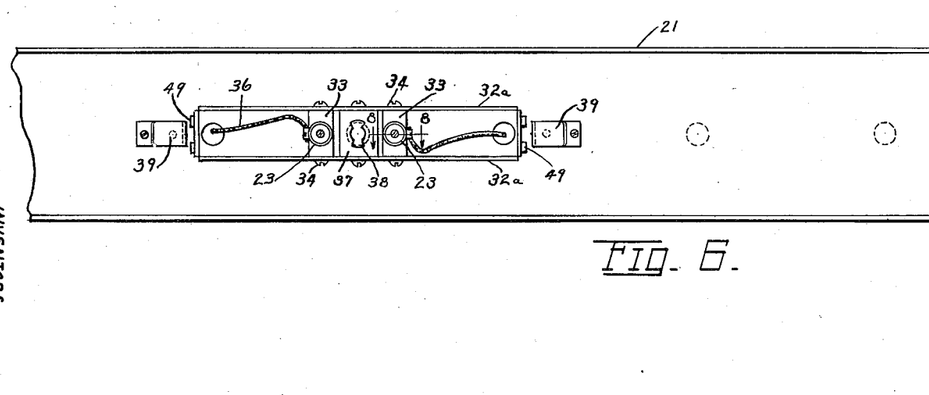
Fig. 6 is a bottom plan view of a portion of the device of Fig. 4, this view being taken along the line 6—6 of Fig. 4.
Figure 7:
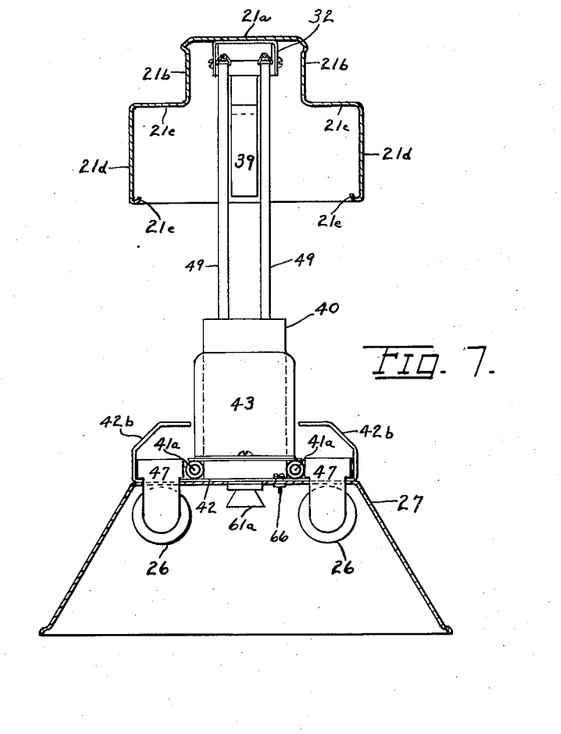
Fig. 7 is an end elevational view of the device of Fig. 4.

The reflector 27 may be detachably connected to the frame 41 by any suitable means such as the wing bolts 66 shown in Figs. 3, 4, and 5 which pass through the upper wall of the reflector and carry at their upper ends a cross pin 66a which is adapted to pass through slot 42a in plate 42, after which a ninety-degree turn latches the wing bolts in position.

Figure 16:
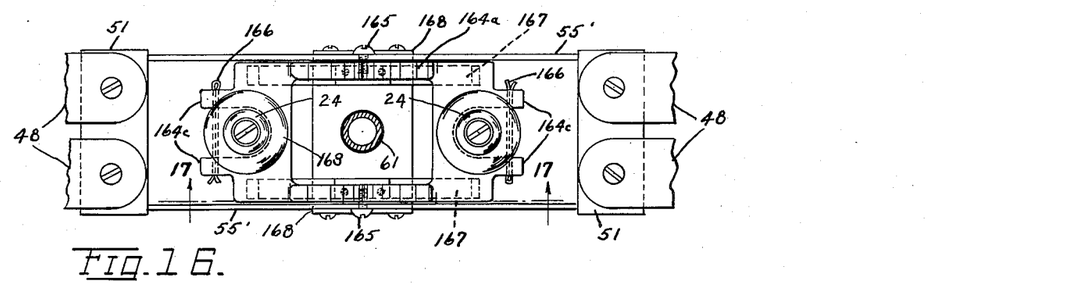
Fig. 16 is a top plan view enlarged of the central portion of Fig. 5 showing a modified form of contact mounting.
Figure 17:
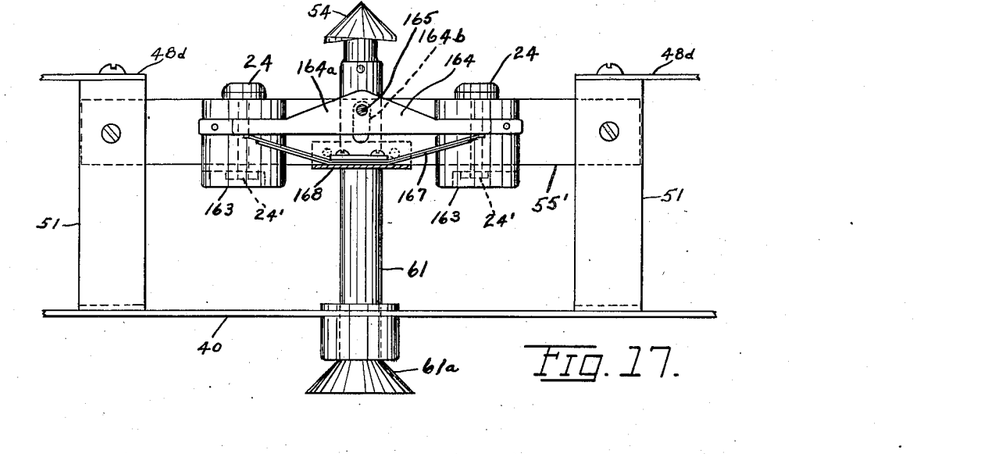
Fig. 17 is a side elevational view of the same taken from the position of line 17—17 of Fig. 16.

Another manner of mounting the contacts 24 which may be substituted for the structure shown in the central portion of Fig. 4 is shown in Figs. 16 and 17. The brackets 51 are like those previously described, but the cross bars 55' are fastened near the upper ends of brackets 51 so as to support the contact structure about to be described. The contacts themselves are each mounted in a porcelain block 163, and these insulator blocks are mounted on opposite ends of the oscillating bracket 164. This bracket has side ears 164a each having a vertical slot 164b therethrough. A screw 165 is fastened in each of the cross bars 55' to enter into the slots 164b, thus removably supporting the bracket 164 in oscillating position with limited vertical movement permitted. Opposite ends of the bracket 164 are bifurcated to provide arms 164c for slidingly receiving a groove in the insulators 163. Cotter pins 166 hold the insulators in the bracket 164. Means is provided for yieldingly urging the bracket 164 upwardly. In the present instance, this comprises a pair of parallel leaf springs 167 each of which has its central portion mounted on an L-shaped bracket 168 secured to the central portion of cross bars 55'. In the usual manner, the electrical apparatus carried by the lowering hanger member is connected to the binding posts 24' which are electrically connected with the contacts 24. It results from this construction that pressure is equalized between the contacts 24 when they engage the mating contacts 23 on the upper fixture.

Figure 18:
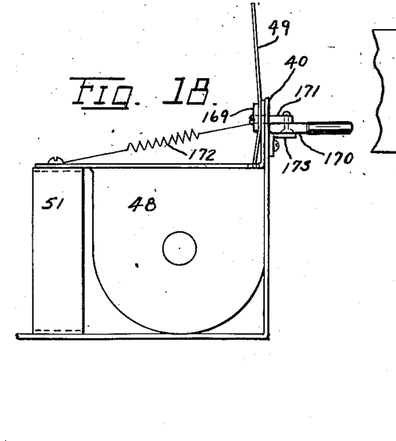
Fig. 18 is an enlarged fragmentary view like a central portion of Fig. 4 showing a side elevational view of a tape-clamping device.
Figure 19:
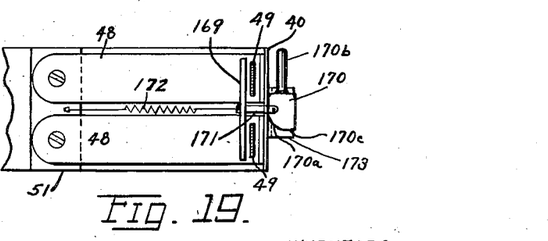
Fig. 19 is an enlarged fragmentary view like a portion of Fig. 5 showing a top plan view of the tape-clamping device.

If desirable or necessary, means may be provided to hold the lowering hanger member 25 in its lowered position while servicing the same by means requiring little effort or attention on the part of the operator. As shown in Figs. 18 and 19, the tapes 49 may be clamped to a fixed portion of the apparatus so that the springs 48c will be unable to wind the tapes on the drum 48a. A very simple manner of doing this is disclosed comprising a clamping bar 169 positioned on the side of tapes 49 opposite the upstanding ear of the bracket 40. Mounted on this bracket is a clamping lever 170 connected by link 171 with the central portion of bar 169. The clamping lever has a cam surface 170a adapted to bear against the bracket 40 and to pull the link 171 toward the right as viewed in Figs. 26 and 27 when the lever 170b is moved approximately ninety degrees in a clockwise direction. The flat surface 170c will then hold the lever in this position against the tendency of spring 172 to release the clamp. The lever 170 rests on a small angle bracket 173 which is secured to the bracket 40. The operation of this clamping device should now be apparent. When the hanger member 25 is in the lowered position desired for servicing, the clamp 170 is moved from its normal released position shown in Fig. 19 to a position ninety degrees clockwise therefrom (Fig. 18) causing the bar 169 to hold the tapes 49 clamped against the bracket 40 immovably. The clamp is quickly released by the reverse movement of the handle 170b when it is desired to return the hanger to its elevated position.

Figure 10:
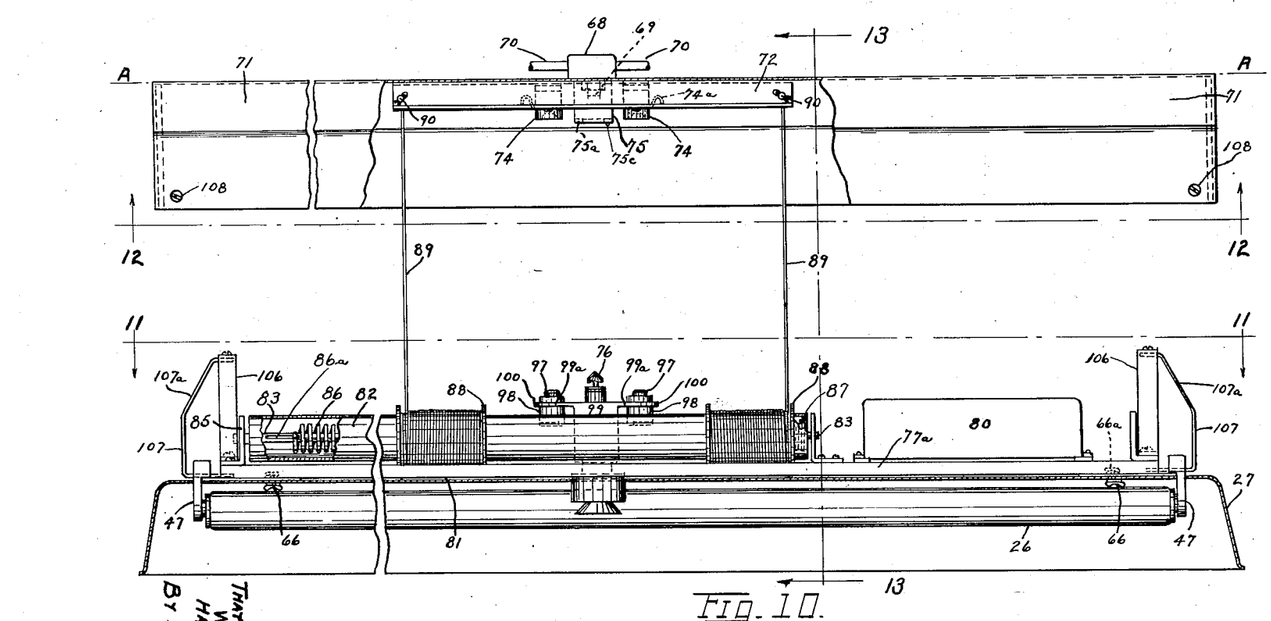
Fig. 10 is a side elevational view similar to Fig. 4 but showing a modified form of our device.
Figure 11:
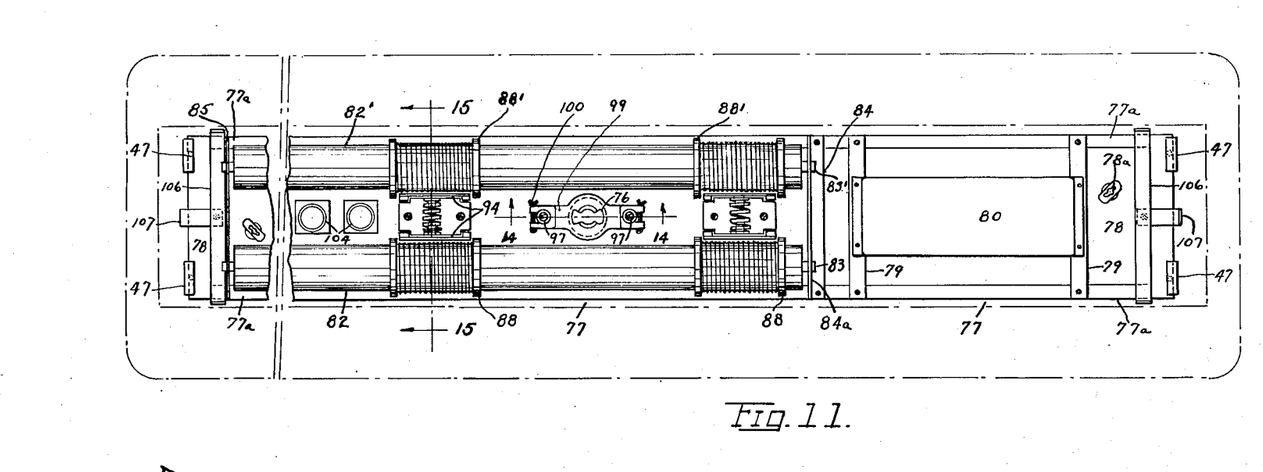
Fig. 11 is a top plan view of a portion of Fig. 10 taken along the line 11—11 of Fig. 10.
Figure 12:
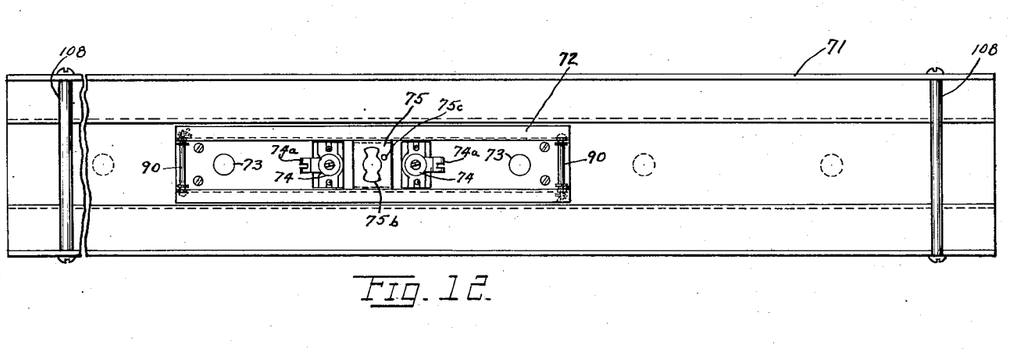
Fig. 12 is a bottom plan view of a portion of the device of Fig. 10, the same being taken along the line 12—12 of Fig. 10.

In Figs. 10 to 15, we have shown a modified form of our device wherein the various parts are of somewhat different character, but they fulfill the functions already described and provide the same basic combination. In this form of our device, we have shown the upper or elevated fixture 71 of trough-like character as best seen in Fig. 12 and having the same general form as the fixture 21 previously described. In the center of this upper fixture is permanently secured the generally channel-like member 72 having a central web 72a, downwardly extending side flanges 72b, and laterally extending flanges 72c at the bottom of the side flanges. This member is wholly housed in the upper portion of the trough 71 as clearly seen in Fig. 13. The parts 71 and 72 may be mounted on drop stems 31 passing through the openings 73, or bolts may be passed through these openings to secure the fixture to a ceiling structure so that the ceiling line occurs on the level of the line A (Fig. 10), or the entire device may be recessed into the ceiling down to the lower edge of reflector 27 in what is known as a flush mounting. A junction-box mounting of the member 71 is shown in Fig. 10. A junction box 68 is mounted in the ceiling in the usual manner and has a stem 69 passing through the members 71, 72, and 75 and secured thereto by a nut on the lower end of the stem. Wiring conduits 70, of a usual character, serve to lead the feed wires to the junction box and thence through the stem 69 to the interior of the member 71. A pair of fixed contacts 74 are mounted on the channel member 72 and insulated therefrom by means similar to that already described in connection with Fig. 8a. These contacts have their binding posts 74a electrically connected with conductors 22 which extend through the trough-like fixture 71 as previously described and may run through a plurality of fixtures 71 placed end to end in a manner similar to that described in Fig. 1. A latch plate 75 is secured to the channel member 72. This has a bottom plate 75a through which is cut the slot 75b to receive the latching head 76 carried by the lowering hanger member.

Figure 13:
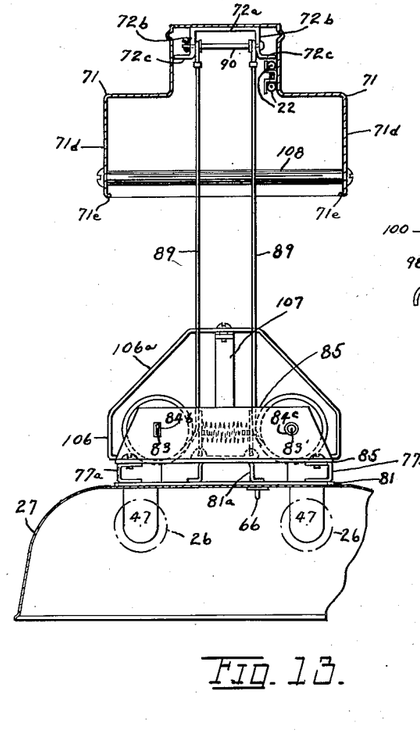
Fig. 13 is a view taken along the line 13—13 of Fig. 10.

This lowering member as best seen in Figs. 10, 11 and 13 comprises an intermediate frame 77 analogous to frame 41 previously described and separable lamps 26 and reflector 27 like those previously described. The frame 77 comprises two elongated parallel side frame members 77a extending substantially the full length of the device, but in the present instance these are channel-shape members with their flanges facing inwardly as best seen in Fig. 13. The side frame members are rigidly connected together at the ends by plates 78 upon which are mounted the tube sockets 47 as before. These plates also have slots 78a for receiving the heads 66a of the wing bolts 66 which detachably secure the reflector 27 to the frame 77, the same as described in connection with the first form of my device. Straps 79 are rigidly secured across the top flanges of the members 77a and support the ballast 80 which serves in the energization of the lamps 26. In the center of the frame 77, the plate 81 is rigidly connected between the frame members 77a and serves to mount certain of the parts later described.

Means is provided for counterbalancing the weight of the parts to be lowered which in function is similar to that previously described. However, in the form here shown, a means is provided for winding and unwinding a much longer length of the flexible tension supports upon which the lowering hanger member is hung. This present device is of the shade-roller type and comprises one or more (two being shown) elongated cylindrical drums 82 and 82', each rotatably mounted on a shaft like 83 and 83' respectively, which extends out opposite ends of drums 82 and 82', and both shafts are supported by bracket means. At the right-hand end, as viewed in Fig. 11, an L-shape bracket 84 is rigidly connected between the frame members 77a, and its upstanding flange 84a has an elongated slot 84b for receiving the flattened end of one of the shafts 83. The bracket also has an opening 84c to receive the end of the other shaft 83'. Likewise at the opposite end, a bracket 85 is rigidly connected across the side frame members 77a and has an upstanding flange having a slotted opening (not shown) exactly like 84b to receive the flattened left end of shaft 83' as viewed in Fig. 11. The left end of shaft 83 is mounted in an opening similar to 84c previously described. Inside of the drums 82 and 82' are elongated helical springs 86, each surrounding its associated shaft and having the left end of the spring secured to shaft 83 or 83' as the case may be and the right-hand end of the spring secured at 87 to drums 82 and 82', respectively (all parts as viewed in Fig. 11). The left-hand end of each spring 86 passes through an elongated slot 86a in the associated shaft to permit spring elongation under torsion.

Spaced on drum 82 are the cable spools 88, and in like manner spools 88' are mounted on drum 82'. These spools may be rigidly connected to their associated drums in any desirable manner although a special mounting will be later described. Each of the spools is grooved as shown to receive one of the cables 89. Each of these cables has an end fastened to the fixed upper channel member 72 by means of the pins 90 which pass through the flanges 72b. The arrangement of the cables on the spools 88 and the direction of rotation of the drums 82, 82' with respect to their associated springs is such that all of the cables are wound and unwound in unison respectively as the lowering hanger member is raised or lowered.

The springs 86 both have an initial tension tending to wind the cables 89 and the spools 88 and 88' and adapted to balance all but a few pounds of the total weight of the parts to be lowered. The relation between the springs 86, the spools 88, 88', and the cables 89 is such that the springs are additionally loaded as the hanger member is lowered. It results from this construction, as in the first-described modification, that when the lowering hanger member is first unlatched from the upper fixture, the slight unbalanced weight of the lower member causes it to drop quickly a short distance giving a quick break between the mating electrical contacts. This first dropping movement additionally loads the springs 86 to the point where the weight of the lower member is wholly balanced. Thereafter a slight pull serves to move the hanger member downwardly and to hold it there while servicing the parts carried on the hanger member. In returning the hanger member to its upper position, the loaded springs aid in the first portion of the movement, and only a slight final push is necessary to latch the hanger member to the upper fixed member.

Figure 15:
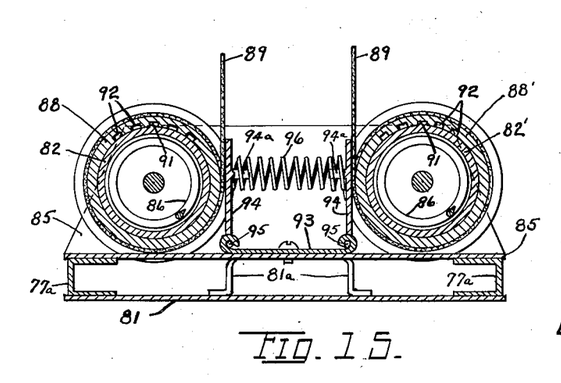
Fig. 15 is an enlarged transverse sectional view taken along the line 15—15 of Fig. 11.

A special mounting means for spools 88 and 88' on the drums 82, 82' is shown in Fig. 15, and this is useful where there is a slight difference in the length of the cables 89 either in original assembly or due to uneven stretching of the cables. In this improvement, key 91 is provided rigid with the drum 82, and a plurality of keyways 92 are provided on the inner face of the spool 88. The key 91 may then be placed in one of the keyways 92 so chosen as to give the adjustment necessary to the associated cable 89.

Special means may be provided for aiding in the winding of the cables 89 on their associated spools and to provide against backlash or loose portions of the cable interfering with the regular winding on the spools. This improvement is clearly shown in Figs. 11 and 15 wherein a plate 93 is fixed to bracket 81a mounted on plate 81, and hinge plates 94 parallel to the cable-receiving surfaces of the spools 88, 88' are connected to the bottom plate by means of the hinge pins 95. Where there are two parallel spools as shown in Fig. 11, we prefer to mount the plates 94 in parallel opposed relationship and utilize a single helical compression spring 96 between the plates 94 so as to urge each plate toward its associated spool. The spring 96 is held in place by the studs 94a on the plates 94. It results from this construction that each cable 89 is caused to follow a spiral groove in its associated winding drum in a regular and even manner.

Electrical contacts 97 are mounted on the lowering hanger member in position to engage and coact with the fixed contacts 74. Means is provided for equalizing the pressure engagement of the two pairs of contacts, and while this functions the same as the means described in connection with the first modification, it is of a somewhat different construction. The contacts 97 are each mounted in an insulating porcelain 98, and these are carried in bifurcated arms 99a of a bracket 99 being held in place by cotter pins 100. The bracket 99 has a sleeve portion 99b which slidably engages over an enlarged portion 101a of stem 101, the lower end of which is clamped on the plate 81 by means of the flange 101b, overlying the plate, and the nut 102 threaded on the lower end of the stem beneath the plate. A helical spring 103 surrounds the upper portion of stem 101 and is engaged between the flange 99c of the bracket and the portion 101a of the stem so as to yieldingly urge the bracket 99 toward its uppermost position. A flange 101c limits the upward movement of the bracket. It results from this construction that the bifurcated arms 99a of the bracket may rock on the central mounting so as to provide an equalization of contact between the two pairs of upper and lower contacts 74, 97. The wires (not shown) for energizing the lamps 26 are suitably connected in a known manner between the contacts 97 and the tube sockets 47 including the proper connections to the ballast 80 and the lamp starters 104. These connections are well known in this art and would only serve to confuse the present drawings.

The latching head 76 is rigidly mounted on the upper end of a stem 105 which is mounted for limited vertical sliding movement inside of the stem 101. The lower end of the stem is flared as shown at 105a. Near the bottom of the stem one of the walls has an elongated slot therethrough as shown at 105b, and opposite this slot is a small notch 102a in the nut 102. In operating the latching device, the operator places the upper end of a pole 29, like that shown in Fig. 2, inside the stem 105 with a small laterally extending button on the rod 29 inserted through slot 105b and notch 102a to a position above the lower wall of nut 102, after which the rod 29 is twisted so as to turn the latch 76 ninety degrees to unlatch it. The hanger member is then lowered, preferably using a jointed rod 29. The rod 29 is not removed through notch 102a until the hanger member is again raised and latched. Obviously, when the hanger member is raised, the latch head 76 is in registration with the slot 75b. After the head passes above plate 75a, the head 76 is turned through a ninety-degree angle so as to lie with its longer dimension crossing the longer dimension of slot 75b so as to firmly hold the lowering hanger member latched to the upper fixed member. A pin 75c limits this movement.

Means is provided for properly registering the lower member with respect to the upper member prior to the engagement of the electrical contacts 74, 97 and prior to the operation of the latching parts. This means differs slightly from that described in connection with the first modification. At opposite ends of the frame 77 at right angles to the frame member 77a are fixed the straps 106, which, as best seen in Fig. 13, have the inclined portions 106a which engage the lower edges 71e of the upper trough fixture 71 so as to guide the hanger member laterally into proper position to enter into the side portion of the upper fixture between the flanges 71d. Endwise alinement is provided by means of straps 107 positioned at opposite ends of the frame 77. The lower end of each strap 107 is fixed to plate 78, and the upper end of each of these straps is secured to the strap 106. Each of these end straps has an inclined portion 107a sloping upwardly and inwardly and adapted to engage a pin 108 extending across the end of the trough-like member 71 and connected between the flanges 71d as best seen in Fig. 13. Thus the lower member is guided endwise so that all of the parts properly enter into the upper trough and so that the electrical contacts and latching parts are in registration.

What we claim is:

1. Lighting apparatus comprising a relatively fixed member in an elevated position and a lowering hanger member adapted to occupy a raised position adjacent and latched to said fixed member or to be unlatched and lowered therebelow, there being mating electrical contacts on said members engaged when said members are latched together, lamp means on said hanger member electrically connected with its associated electrical contacts, flexible supports connected between said members, equally spaced on each side of the center thereof adapted to hold said hanger member horizontal, spring counterbalance means on one of said members and connected with each of said flexible supports to wind up and pay out the supports as said hanger member is respectively raised and lowered, a positive latch individual to a pair of said coacting fixed and lowering members for latching said lowering member to said fixed member and positioned centrally of said members, an operator for said latch having a bayonet joint connection opening downwardly and adapted to receive a mating rod held by a person on the floor beneath said lighting apparatus, and said latch and operator being independent of said flexible supports.

2. The combination of claim 1 including a plurality of said mating contacts on one of said members, and a support for said plural contacts including pressure equalizing means for providing substantially equal pressure between mating contacts when said members are latched together.

3. The combination of claim 1 including a pair of said flexible supports on each side of the center of said hanger member, and each said pair being spaced on a line generally at right angles to a longitudinally extending center-line of said hanger member, whereby to stabilize and register said hanger member with said fixed member as said members approach latched position.

THAYER B. FARRINGTON.
WADE T. KELLER.
HAROLD L. DALZELL.

REFERENCES CITED

The following references are of record in the file of this patent:

UNITED STATES PATENTS

| Number | Name | Date |
| --- | --- | --- |
| 261,262 | Seymour | July 18, 1882 |
| 1,552,654 | Thompson | Sept. 8, 1925 |
| 1,559,669 | Brown | Nov. 3, 1925 |
| 1,617,028 | Rekar | Feb. 8, 1927 |
| 1,732,622 | Thompson | Oct. 22, 1929 |
| 2,268,731 | Van Bloem | Jan. 6, 1942 |
| 2,287,565 | Phillips | June 23, 1942 |
| 2,290,143 | Farrington | July 14, 1942 |
| 2,291,490 | Naysmith | July 28, 1942 |
| 2,334,139 | Wilson | Nov. 9, 1943 |
| 2,377,872 | Farrington et al. | June 12, 1945 |
| 2,439,885 | Darley | Apr. 20, 1948 |